United States Patent
Nakagawa et al.

[11] Patent Number: 5,463,810
[45] Date of Patent: Nov. 7, 1995

[54] METHOD OF MANUFACTURING PLUNGER BARREL

[75] Inventors: Toshihiro Nakagawa, Higashimatsuyama; Toshiaki Sakai, Oura; Hiroaki Nozaki, Higashimatsuyama, all of Japan

[73] Assignee: Zexel Corporation, Tokyo, Japan

[21] Appl. No.: 140,490

[22] Filed: Oct. 25, 1993

[30] Foreign Application Priority Data

Oct. 30, 1992 [JP] Japan .................. 4-315937

[51] Int. Cl.$^6$ .................................................. B23P 15/00
[52] U.S. Cl. .................. 29/888.4; 29/890.132; 29/558
[58] Field of Search .............. 29/888.4, 888.01, 29/890.132, 890.126, 890.128, 558; 60/737

[56] References Cited

U.S. PATENT DOCUMENTS

| | | | |
|---|---|---|---|
| 4,554,817 | 11/1985 | Dier | 29/890.132 |
| 4,588,161 | 5/1986 | Adams | 29/890.128 |
| 4,614,014 | 9/1986 | Ferguson | 29/890.132 |
| 4,768,268 | 9/1988 | Ishihara et al. | 29/890.132 |
| 4,799,303 | 1/1989 | Prinz et al. | 29/890.132 |
| 4,831,700 | 5/1989 | Halvorsen et al. | 29/890.126 |
| 5,235,746 | 8/1993 | Leonard | 29/890.126 |
| 5,267,396 | 12/1993 | Wada et al. | 29/890.128 |

*Primary Examiner*—Irene Cuda
*Attorney, Agent, or Firm*—Sughrue, Mion, Zinn, Macpeak & Seas

[57] ABSTRACT

A plunger barrel has a sliding bore in which a plunger is slid, a sleeve acceptor in the shape of a hole for a control sleeve which is formed in an intermediate portion of the sliding bore and a window portion which is opened in a wall defining the sleeve acceptor. The plunger barrel is manufactured by the steps of preparing a blank having one end portion and another end portion, forming a first bore axially from the one end portion of the blank, so as to provide a diameter equal to that of the sleeve acceptor, to an intermediate portion of the blank, drawing the one end portion of the blank so that a portion in which the sleeve acceptor is formed remains, forming a second sliding bore in the blank so as to penetrate from the one end portion to the other end portion of the blank, and forming a window portion in a wall of the sleeve acceptor.

8 Claims, 9 Drawing Sheets

[5,463,810]

METHOD OF MANUFACTURING PLUNGER BARREL

BACKGROUND OF THE INVENTION

The present invention relates to a method of producing a plunger barrel and, in particular, a plunger barrel having a prestroke changing mechanism and which is used for a fuel injection pump in an internal-combustion engine.

A fuel injection pump in an internal-combustion engine is in general provided with a plunger barrel in which a plunger for transmitting fuel under pressure into a cylinder of an engine is accommodated. The plunger barrel has a sliding bore in which the plunger is slid, a control sleeve acceptor in the shape of a hole provided for the sliding bore and a window opened to a wall defining the acceptor hole, for example, as disclosed in Japanese Patent Laid-Open (KOKAI) 61-123756 (123756/1986).

In the conventional technology, when the plunger barrel of the kind described above is manufactured, the plunger barrel is manufactured by independently producing two parts, i.e., an upper flange portion and a lower barrel portion, with the control sleeve hole being a boundary, which are then integrated together through a cooling fit working and finally performing a finishing working, or is manufactured from a single shape member by first forming an outer shape of the plunger barrel and then forming the window through a machine working such as cutting working.

However, in the first method, it takes a long time to produce the plunger barrel and an increased number of processing steps is required because the flange portion and the barrel portion are to be independently manufactured. In the second method, the window opening is formed through the cut working, so that it takes a further longer time to produce the plunger barrel.

SUMMARY OF THE INVENTION

An object of the present invention is to substantially eliminate defects or drawbacks encountered in the prior art described above and to provide a method of producing a plunger barrel provided for a fuel injection pump, which has many advantages such as a shorter time for producing a plunger barrel and lesser processing steps.

This and other objects can be achieved according to the present invention by providing a method of manufacturing a plunger barrel having a sliding bore in which a plunger is slid, a sleeve acceptor in the shape of a hole for a control sleeve which is formed in an intermediate portion of the sliding bore and a window portion which is opened in a wall defining the sleeve acceptor, the method comprising the steps of:

preparing a blank having one end portion and another end portion, forming a first bore axially from the one end portion of the blank, so as to provide a diameter equal to that of the sleeve acceptor, to an intermediate portion of the blank;

drawing the one end portion of the blank so that a portion in which the sleeve acceptor is formed remains;

forming a second sliding bore in the blank so as to penetrate from the one end portion to the other end portion of the blank; and forming a window portion in a wall of the sleeve acceptor.

In a preferred embodiment, the bore forming step is performed through a plurality of lathe turning workings. The first bore forming step includes a stepped portion formation to the sliding bore.

The drawing step is performed by using a plurality of molds having various inner diameters, and the molds have inner diameters becoming smaller in accordance with the drawing step. The drawing step is performed so as to form an arcuate portion to the sleeve acceptor to provide a predetermined arc shape.

Burrs on all the bored portions are removed after the bore forming steps.

According to the present invention of the characters described above, the bore is formed in the blank from one end thereof and then drawn so that a portion to which the sleeve acceptor in the shape of a hole is formed remains. In the next step, another bore is formed throughout the axial length of the blank and the window is opened to the acceptor wall of the control sleeve.

According to this plunger manufacturing method, it is not necessary to independently produce the flange portion and the barrel portion, then to integrate them through the cooling fit working and to form the window opening through the cut working, so that the plunger barrel can be manufactured as an integrated, unitary member from one blank in a short time with a lesser number of processing steps.

The nature and further features of the present invention will be made more apparent through the following descriptions made with reference to the accompanying drawings.

BRIEF DESCRIPTION OF THE DRAWINGS

In the accompanying drawings:

FIG. 2 shows an embodiment of a method of manufacturing a plunge barrel according to the present invention through the following steps represented by FIGS. 2A to 2O, in which:

DETAILED DESCRIPTION OF THE PREFERRED EMBODIMENT

An embodiment of the present invention will be described hereunder with reference to the drawings.

Figure 1:
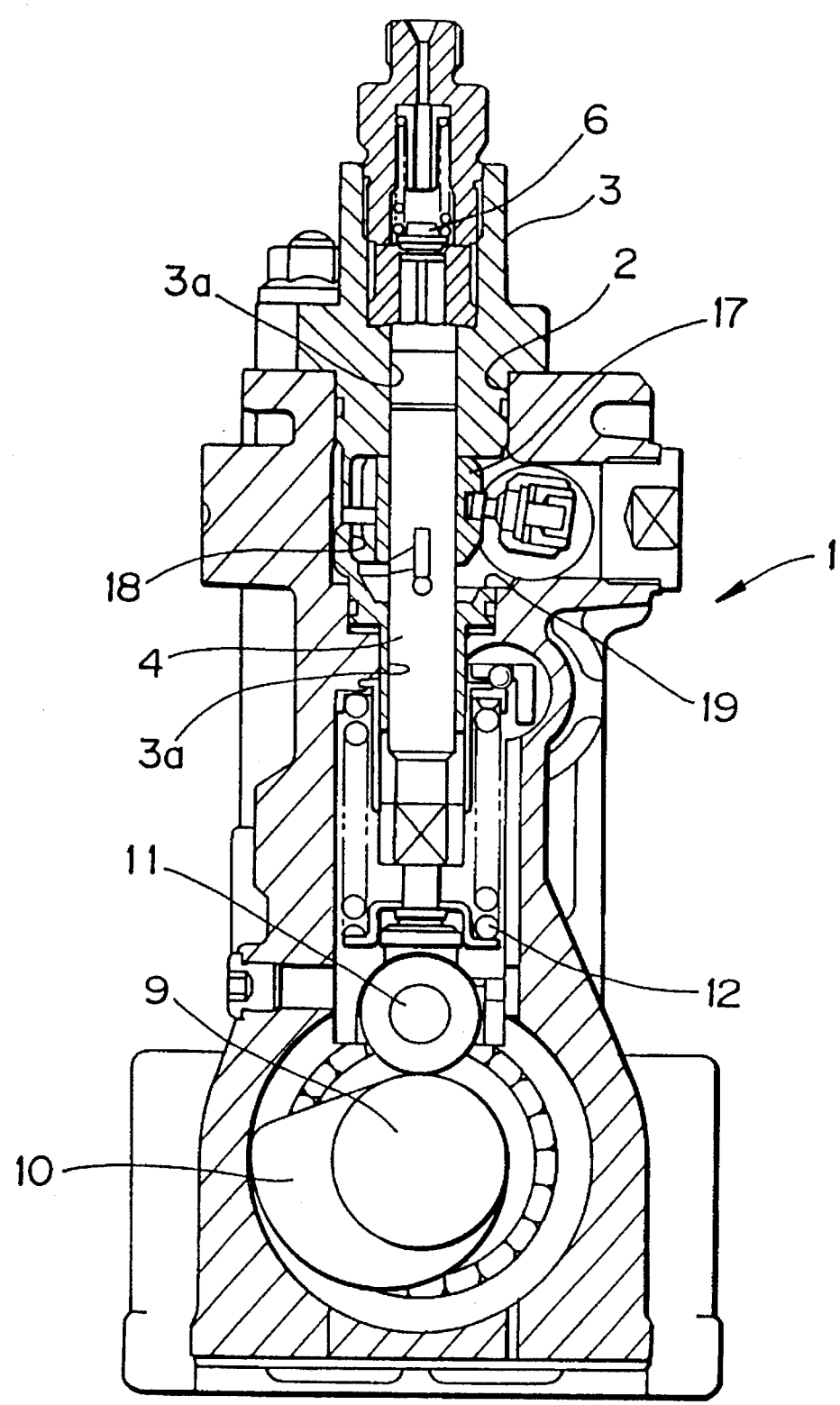
FIG. 1 is an elevational section of a fuel injection pump which is provided with a plunger barrel.

A plunger barrel having a prestroke changing mechanism manufactured by the method according to the present invention is provided for a fuel injection pump as shown in FIG. 1, which is used for an internal-combustion engine, for example.

In FIG. 1, a pump body 1 has longitudinal, i.e. axial, bores 2 corresponding in number to the number of cylinders of an engine, in which a plunger barrel 3 is fixed. The plunger barrel 3 has a sliding bore 3a, into which a plunger 4 is accommodated to be rotatable and reciprocative inside the sliding bore 3a and the lower end of the plunger 4 abuts, via a tappet, against a cam 10 formed on a cam shaft 9, which is connected to a power output shaft of the engine.

When the cam shaft 9 is turned, the plunger 4 is reciprocated following the contour of the cam 10 in association with a spring 12, whereby the plunger 4 transmits a fuel under pressure into the cylinder of the engine via a delivery valve 6.

A control sleeve 17 is mounted in the plunger 4, the control sleeve 17 being accepted in an acceptor 18 in the shape of a hole for a control sleeve of the plunger barrel 3. The sleeve acceptor 18 is formed in the middle of the sliding bore 3a and a window opening 19 is formed in to a wall defining the sliding bore 3a.

Figure 2A:
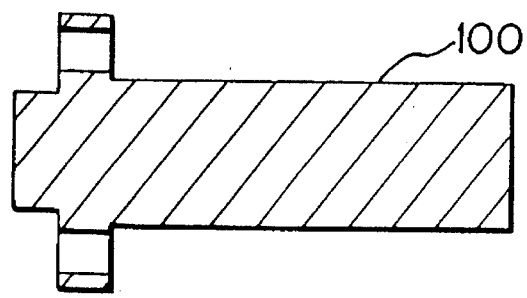
FIG. 2A is a sectional view of a blank.
Figure 2B:
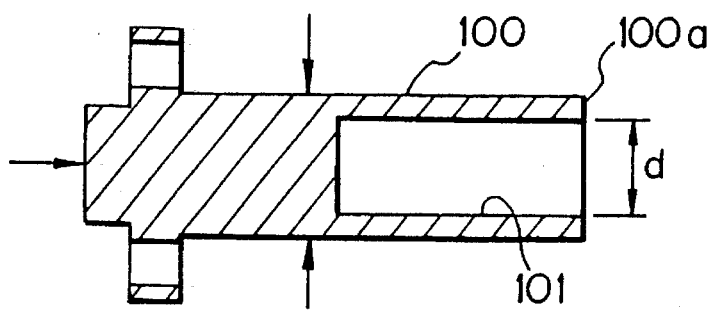
FIG. 2B is a sectional view of the blank shown in FIG. 2A which is subjected to the first lathe turning working.
Figure 2C:
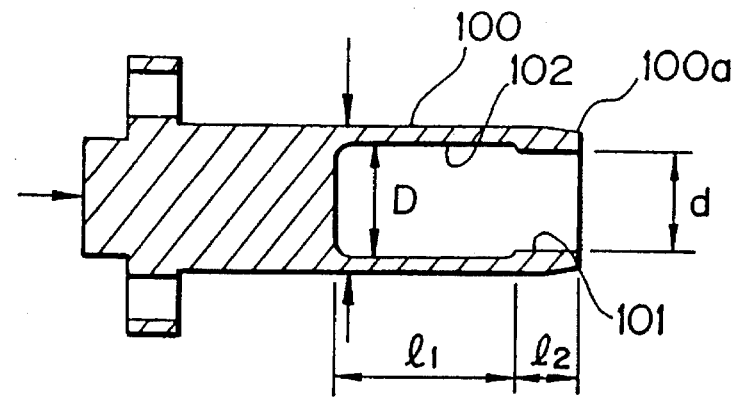
FIG. 2C is a sectional view of the blank shown in FIG. 2B which is subjected to the second lathe turning working.
Figure 2D:
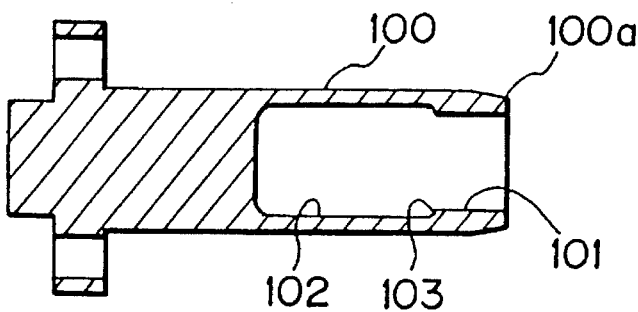
FIG. 2D is a sectional view of the blank shown in FIG. 2C which is subjected to bondarizing.
Figure 2E:
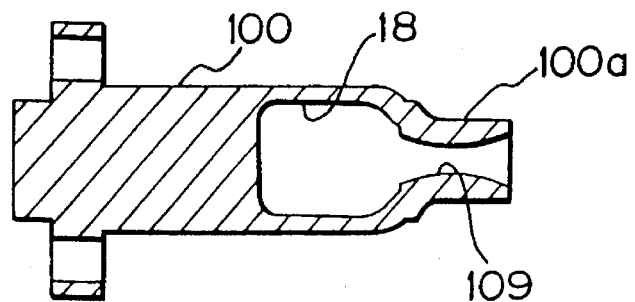
FIG. 2E is a sectional view of the blank shown in FIG. 2D which is subjected to a drawing working.
Figure 2F:
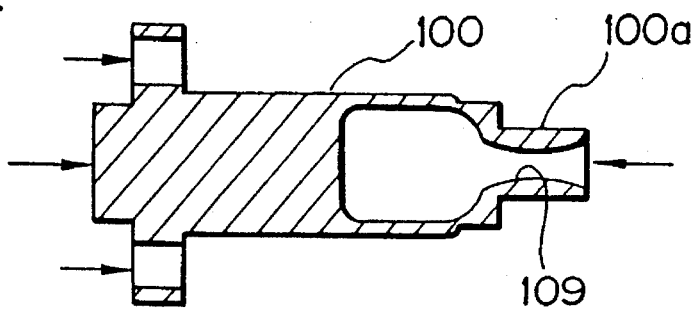
FIG. 2F is a sectional view of the blank shown in FIG. 2E which is subjected to the third lathe turning working.
Figure 2G:
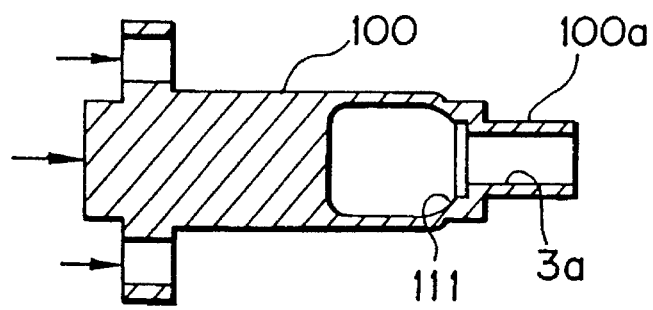
FIG. 2G is a sectional view of the blank shown in FIG. 2F which is subjected to the forth lathe turning working.
Figure 2H:
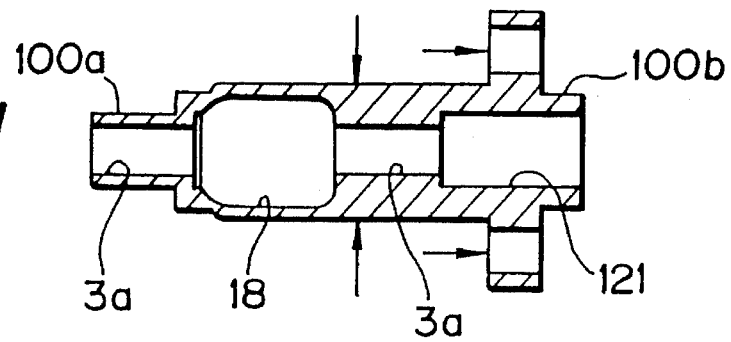
FIG. 2H is a sectional view of the blank shown in FIG. 2G which is subjected to the fifth lathe turning working.
Figure 2I:
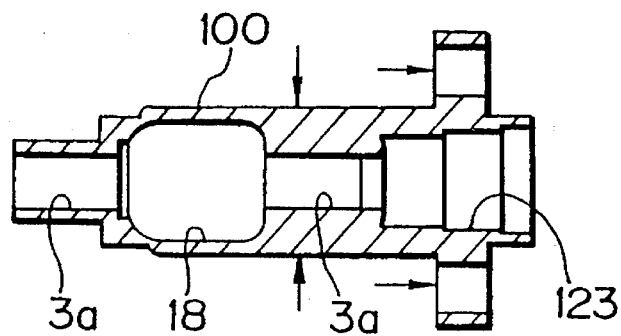
FIG. 2I is a sectional view of the blank shown in FIG. 2H which is subjected to the sixth lathe turning working.
Figure 2J:
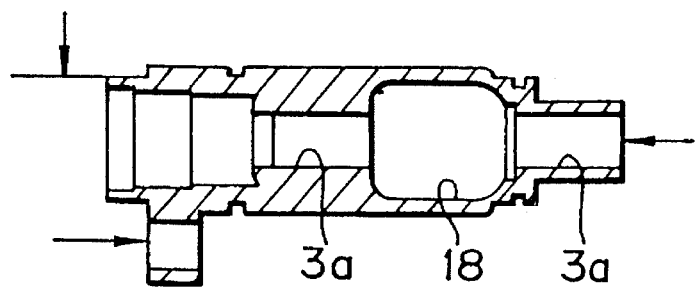
FIG. 2J is a sectional view of the blank shown in FIG. 2I which is subjected to the seventh lathe turning working.
Figure 2K:
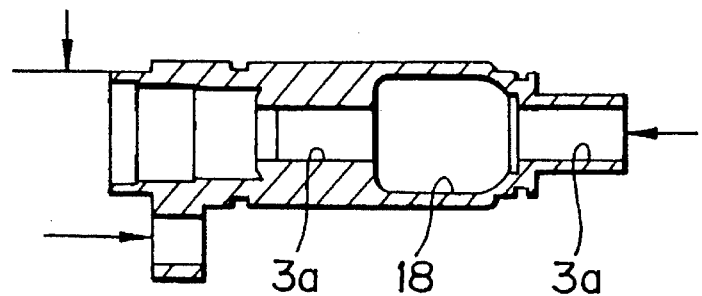
FIG. 2K is a sectional view of the blank shown in FIG. 2J which is subjected to the eighth lathe turning working.
Figure 2L:
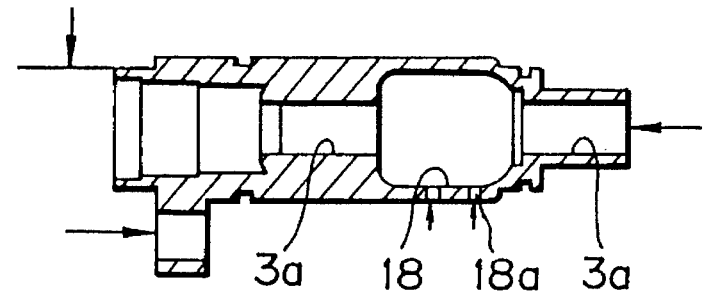
FIG. 2L is a sectional view of the blank shown in FIG. 2J which is subjected to a hole forming working.
Figure 2M:
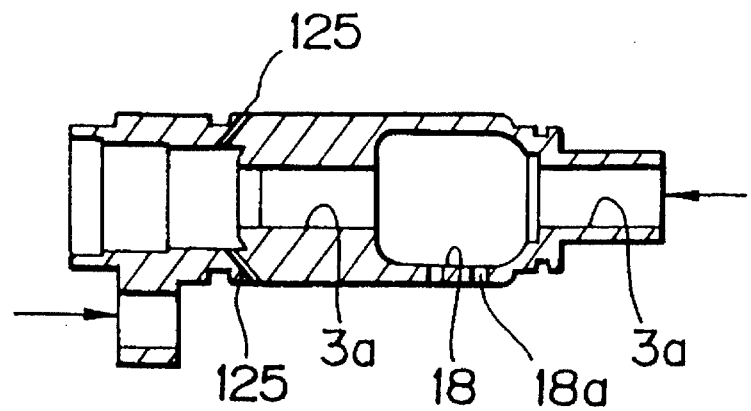
FIG. 2M is a sectional view of the blank shown in FIG. 2L which is subjected to an oblique hole forming working.
Figure 2N:
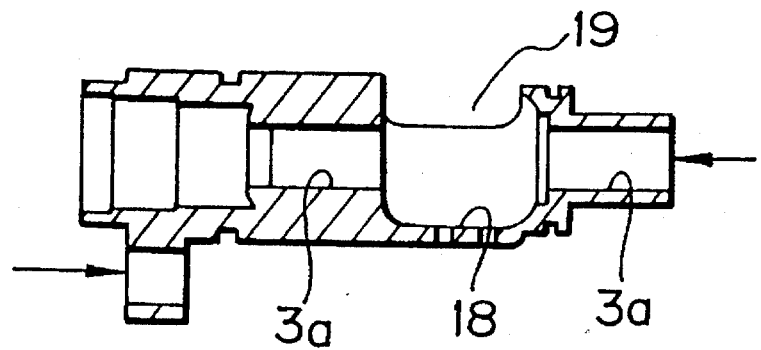
FIG. 2N is a sectional view of the blank shown in FIG. 2L which is subjected to a window forming working and a chamfering working.
Figure 2O:
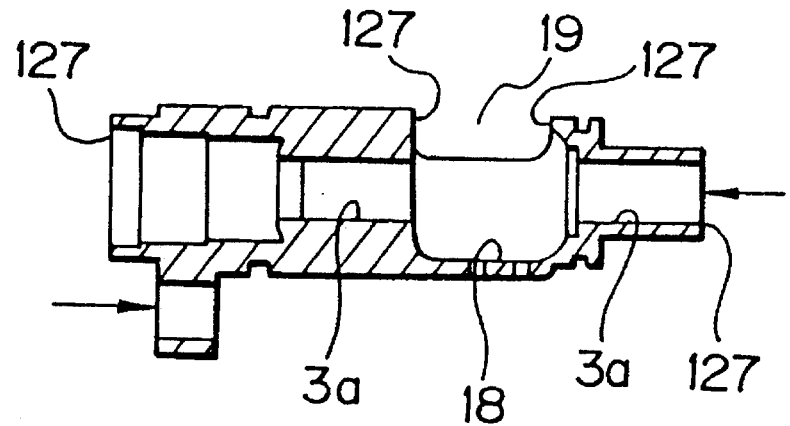
FIG. 2O is a sectional view of the blank shown in FIG. 2L which is subjected to a burr removing working.
Figure 3:
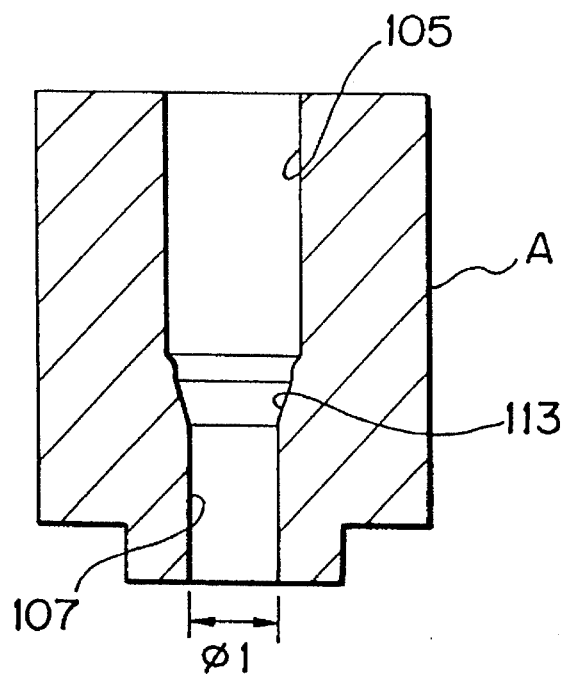
FIGS. 3 to 8 are schematic elevational sections of first to sixth molds which are used for the drawing working in a method of manufacturing a plunger barrel according to the present invention.
Figure 4:
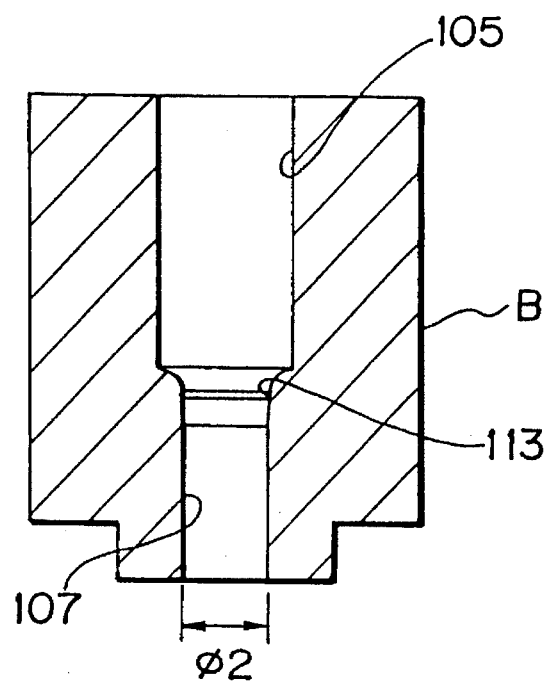
Figure 5:
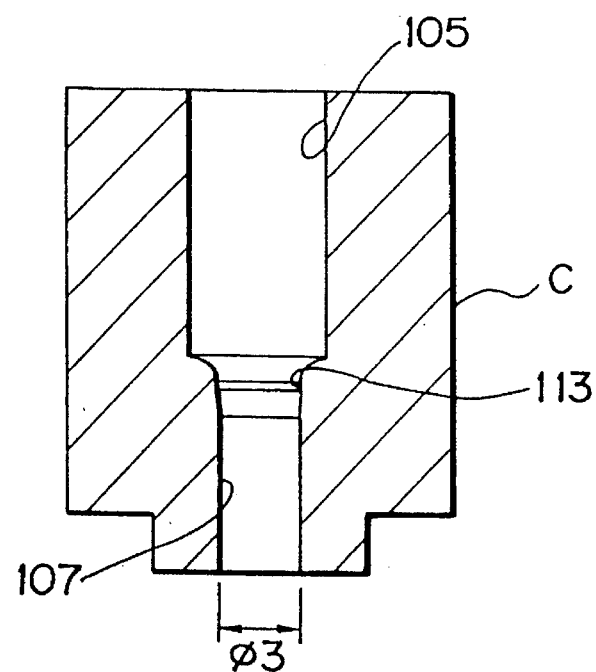
Figure 6:
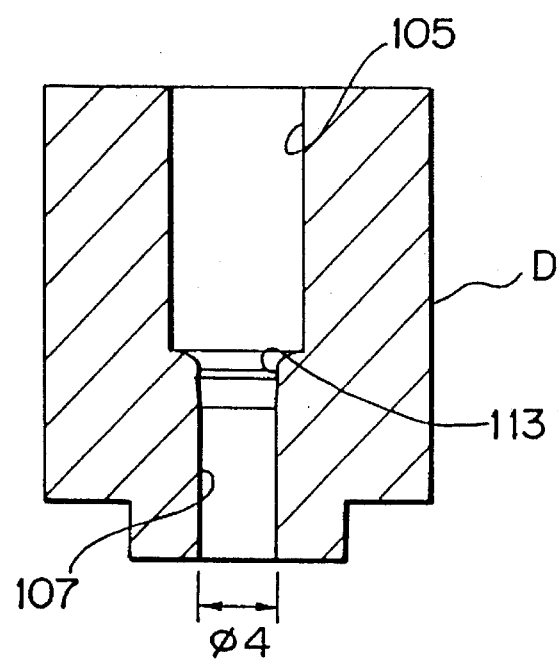
Figure 7:
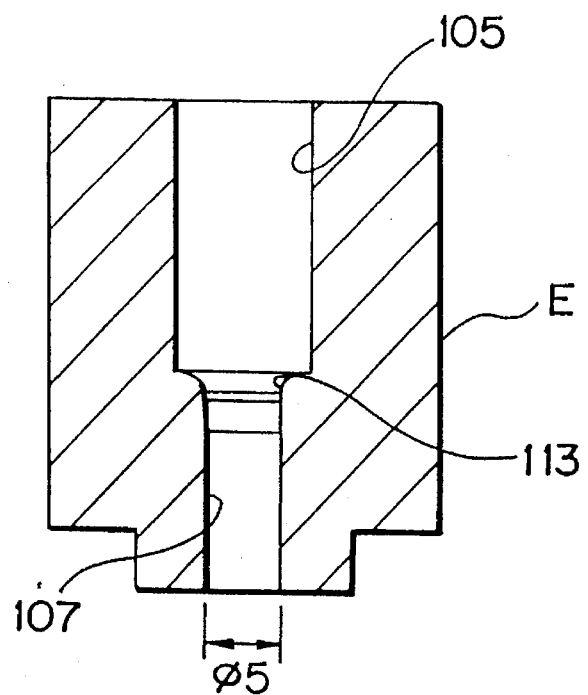
Figure 8:
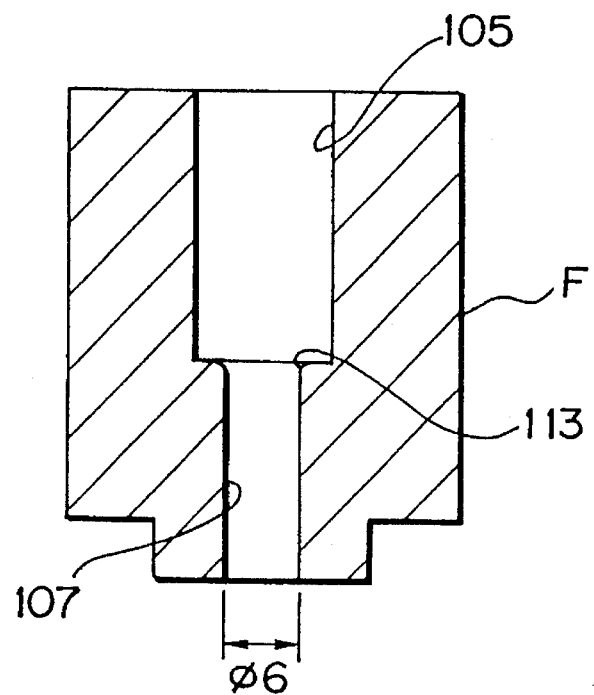
Figure 9:
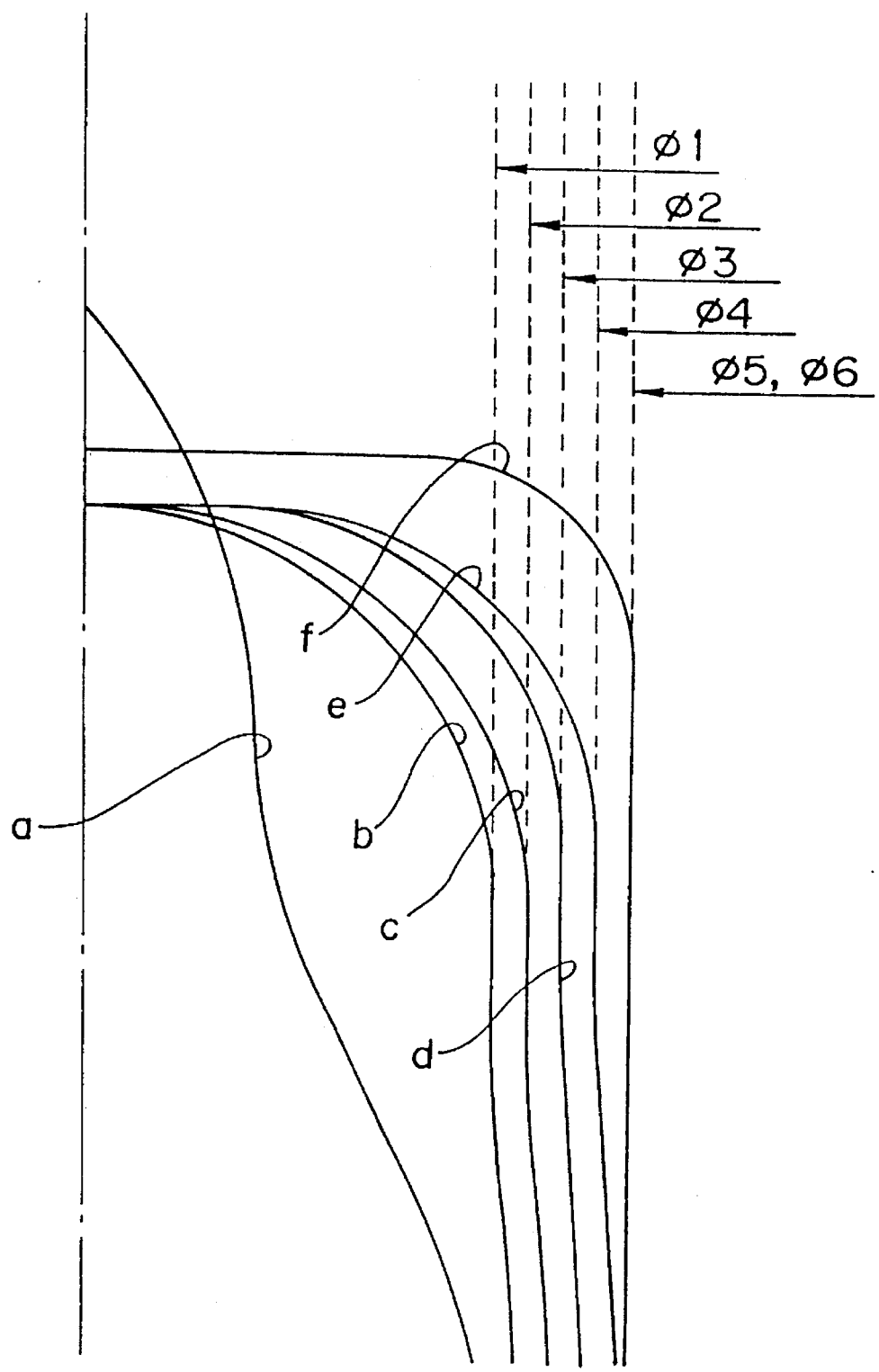
FIG. 9 is a graph showing arcs of the bottom portion for a control sleeve hole formed by means of the first to sixth molds of FIGS. 3 to 8.

FIG. 2, including FIGS. 2A to 2O, shows an embodiment of a method of manufacturing a plunger barrel from a blank according to the present invention. According to the embodiment, the plunger barrel 3 having a sliding bore 3a can be manufactured as an integral member.

Referring to FIGS. 2A to 2O, first, a blank 100 having a flange is prepared, as shown in FIG. 2A. The material of the blank 100 is preferably made of a material represented by SUJ2. Then, through the first lathe turning working, a bore 101 is formed from one end 100a of the blank 100 so as to provide a diameter d slightly smaller than a diameter D of the sleeve acceptor 18 for the control sleeve, as shown in FIG. 2B. This bore 101 is formed at a position in which the control sleeve 18 is to be formed.

Next, as shown in FIG. 2C, through the second lathe turning working, a bore 102, which has the same diameter D as that of the sleeve acceptor 18 and has a length $l_1$, i.e., a depth, preliminarily determined, is formed within the bore 101. A portion of the bore 101 having a length $l_2$ remains as it is.

The thus formed blank 100 is then bondarized as shown in FIG. 2D. A stepped portion 103 is formed on the boundary between the bore 101 and the bore 102. The stepped portion 103 is useful for increasing the precision of a drawing process as described hereinafter.

The one end 100a of the blank 100 is then drawn while a portion to which the sleeve acceptor 18 is formed remains. The drawing process is carried out by using six molds A to F as shown in FIGS. 3 to 8. The first mold A to the sixth mold F have, respectively, insert bores 105, into which the one end 100a of the blank 100 is inserted, and drawing bores 107, which are used for drawing the end 100a. The molds A to F have the drawing bores 107 having inner diameters Φ1 to Φ6, (Φ1>Φ2>Φ3>Φ4>Φ5, Φ5=Φ6), respectively.

In order to draw the one end 100a of the blank 100 as shown in FIG. 2E, the one end 100a of the blank 100 is inserted into the insert bore 105 of the first mold A and the other end of the blank 100 is then pushed by means of a press, for example, to perform the first drawing operation. The thus drawn one end 100a of the blank 100 is then inserted into the insert bore 105 of the second mold B and the other end of the blank is also pushed with the press to perform the second drawing operation.

Subsequently, the above-described operation is repeated by using the molds in the order of the third to sixth molds C to F, to perform the third, fourth, fifth, sixth, i.e., final drawing operations, giving the drawn blank 100 having the finally drawn form, as shown in FIG. 2E. When the final drawing is performed, it is important to ensure an intermediate portion of the blank 100 to which the control sleeve acceptor 18 having a predetermined shape is formed and to ensure the drawn bore 109 having a diameter slightly smaller than the diameter of the sliding bore 3a of the plunger 4.

In order to ensure the portion to which the sleeve acceptor 18 of the predetermined shape is formed, it is necessary to form a bottom portion 111 of the sleeve acceptor 18 so as to provide an arc of the predetermined shape.

For forming the arc of the bottom portion 111, the portions 113 of the molds A to F between the insert bores 105 and the drawing bores 107 have various arcs. The arcs a to f of the molds A to F are formed gradually smaller in this order.

The one end 100a of the blank 100 is gradually drawn by the molds A to F having the bottom portions 111 so as to provide the arcs a to f, so that the form of the one end 100a of the blank 100 is gradually changed to obtain the desired end 100a including the portion to which the sleeve acceptor 18 is formed with the predetermined shape as shown in FIG. 2E.

It is to be noted that it has been proved through various experiments that the step of using the mold E may be omitted and also proved that the provision of the stepped portion 103 attains an extremely effective function for changing the form of the portion 111 to the arc having the predetermined shape.

Following such drawing operation, the third lathe turning working is performed to provide an external shape of the one end 100a of the blank 100, as shown in FIG. 2F. The fourth lathe turning working is then performed to form the sliding bore 3a for the plunger 4, as shown in FIG. 2G. In the fifth lathe turning working as shown in FIG. 2H, a bore 121 for the delivery valve 6 is formed from the other end 100b of the blank 100, and another sliding bore 3a for the plunger 4 is additionally formed. In the sixth lathe turning working as shown in FIG. 2I, the bore 121 is subjected to a cutting working for forming a female screw thread 123 for inserting the delivery valve 6.

The seventh and eighth lathe turning workings including a finishing working for the sliding bore 3a are then performed as shown in FIG. 2J and FIG. 2K, and two bores 18a for guide pins are formed as shown in FIG. 2L. Oblique bores 125 which are necessary for the plunger barrel 3 are then formed as shown in FIG. 2M, and a window 19 is opened in the wall of the sleeve acceptor 18 for the control sleeve and the opened portion of the window 19 is subjected to chamfering working as shown in FIG. 2N. All bored portions are then subjected to a burr removing working as shown by a reference numeral 127 in FIG. 2O.

What is claimed is:

1. A method of manufacturing a plunger barrel as a unitary member having a sliding bore in which a plunger is slid, a sleeve acceptor in the shape of a hole for a control sleeve which is formed in an intermediate portion of the sliding bore and a window portion which is opened in a wall defining the sleeve acceptor, the method comprising the steps of:

preparing a single blank having one end portion and an other end portion;

forming a first bore axially from the one end portion of the blank, so as to provide a diameter equal to that of the sleeve acceptor, to an intermediate portion of the blank;

drawing the one end portion of the blank so that a portion in which the sleeve acceptor is formed remains;

forming a second sliding bore in the blank so as to penetrate from the one end portion to the other end portion of the blank; and forming a window portion in a wall of the sleeve acceptor.

2. A method according to claim 1, wherein the bore forming step comprises performing a plurality of lathe turning workings.

3. A method according to claim 1, wherein the first bore forming step includes forming a stepped portion in the sliding bore.

4. A method according to claim 1, wherein the drawing step comprises using a plurality of molds having various inner diameters.

5. A method according to claim 4, wherein the molds have inner diameters becoming smaller in accordance with the drawing step.

6. A method according to claim 5, wherein the drawing step comprises forming an arcuate portion to the sleeve acceptor to provide a predetermined arc shape.

7. A method according to claim 1, further comprising the step of forming a screw thread in the other end portion of the blank.

8. A method according to claim 1, further comprising the step of removing burrs from all bored portions.

* * * * *